(12) United States Patent
Wen et al.

(10) Patent No.: US 12,101,397 B2
(45) Date of Patent: Sep. 24, 2024

(54) DATA COMMUNICATION METHOD, APPARATUS, AND SYSTEM

(71) Applicant: BEIJING QBOSON QUANTUM TECHNOLOGY CO., LTD., Beijing (CN)

(72) Inventors: Kai Wen, Beijing (CN); Yin Ma, Beijing (CN)

(73) Assignee: BEIJING QBOSON QUANTUM TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/557,286

(22) PCT Filed: Apr. 21, 2022

(86) PCT No.: PCT/CN2022/088131
§ 371 (c)(1),
(2) Date: Oct. 25, 2023

(87) PCT Pub. No.: WO2022/228262
PCT Pub. Date: Nov. 3, 2022

(65) Prior Publication Data
US 2024/0214192 A1  Jun. 27, 2024

(30) Foreign Application Priority Data
Apr. 26, 2021 (CN) .......................... 202110454591.X

(51) Int. Cl.
*H04L 9/08* (2006.01)
(52) U.S. Cl.
CPC ............ *H04L 9/0855* (2013.01); *H04L 9/085* (2013.01); *H04L 9/0869* (2013.01)
(58) Field of Classification Search
None
See application file for complete search history.

(56) References Cited

U.S. PATENT DOCUMENTS 9,203,812 B2 * 12/2015 Resch ................. H04L 63/0428
9,413,529 B2 * 8/2016 Resch ................. H04N 21/2347
(Continued)

FOREIGN PATENT DOCUMENTS

CN   103326822 A   9/2013
CN   109962773 A   7/2019
(Continued)

OTHER PUBLICATIONS

Jingjing Li, Research on Data Privacy Protection of Smart Grid Data Based on Blockchain, East China Jiaotong University Master's Thesis, 2020, pp. 1-58.
(Continued)

*Primary Examiner* — Bassam A Noaman
(74) *Attorney, Agent, or Firm* — Bayramoglu Law Offices LLC

(57) ABSTRACT

A data communication method includes: processing to-be-transmitted target secret information by using a preset secret sharing algorithm to obtain a plurality of secret fragments; and distributing the plurality of secret fragments to each relay node in a first relay node layer among preset M relay node layers to transmit the plurality of secret fragments to a receiving device by means of each relay node in the M relay node layers, so that the receiving device can obtain the target secret information based on each received secret fragment under the condition that the number of the received secret fragments is greater than or equal to a preset security threshold. By applying the data communication method, in the case that the number of breached relay nodes does not exceed the preset security threshold, an attacker cannot obtain a sufficient number of secret fragments to crack the target secret information.

8 Claims, 5 Drawing Sheets

(56) References Cited

U.S. PATENT DOCUMENTS

| | | | |
|---|---|---|---|
| 10,805,079 B2* | 10/2020 | Lu | H04L 9/0863 |
| 2014/0229731 A1* | 8/2014 | O'Hare | H04L 9/085 |
| | | | 713/165 |
| 2016/0277542 A1* | 9/2016 | Bhatia | H04L 67/1014 |
| 2017/0005992 A1 | 1/2017 | Ari et al. | |
| 2023/0205490 A1* | 6/2023 | Jacak | G06N 10/20 |
| | | | 708/250 |

FOREIGN PATENT DOCUMENTS

| | | |
|---|---|---|
| CN | 110365609 A | 10/2019 |
| CN | 111127017 A | 5/2020 |
| CN | 111404672 A | 7/2020 |
| CN | 111448779 A | 7/2020 |
| CN | 111865567 A | 10/2020 |
| CN | 112019331 A | 12/2020 |
| CN | 113079008 A | 7/2021 |

OTHER PUBLICATIONS

Xuan Wang, Research on Dynamic Routing and Application Access in Quantum Cryptography Communication Network, Xidian University Master Thesis, 2016, pp. 1-52.

* cited by examiner

DATA COMMUNICATION METHOD, APPARATUS, AND SYSTEM

CROSS REFERENCE TO THE RELATED APPLICATIONS

This application is the national phase entry of International Application No. PCT/CN2022/088131, filed on Apr. 21, 2022, which is based upon and claims priority to Chinese Patent Application No. 202110454591.X, filed on Apr. 26, 2021, the entire contents of which are incorporated herein by reference.

TECHNICAL FIELD

The present invention relates to the technical field of communications, in particular to a data communication method, apparatus, and system.

BACKGROUND

With the development of science and technology, quantum communication technology is more and more widely used. Quantum communication improves the security compared to classical communication, however, restricted to the physical conditions, photon loss may occur during long-distance communication. Moreover, with the increase of distance, the transmission rate of the secure quantum communication decreases exponentially. Therefore, in order to guarantee communication security of a quantum communication system, a relay needs to be provided in the quantum communication system.

In the prior art, trusted relay nodes are usually provided between a transmitting device and a receiving device of the quantum communication system, and the transmitting device transmits communication information to the trusted relay nodes, which then transmit communication information to the receiving device. However, with this method, communication content may be leaked in the case that the relay nodes are breached, which may result in the total loss of the security advantage of quantum communication relative to classical communication. Therefore, how to guarantee the security of quantum relay communication has become an urgent technical problem to be solved by the technicians of the art.

SUMMARY

The technical problem to be solved by the present invention is to provide a data communication method, which may guarantee the security of quantum relay communication.

The present invention further provides a data communication apparatus to ensure the implementation and application of the above method in practice.

A data communication method, which is applied to a transmitting device and includes:

processing to-be-transmitted target secret information based on a set security threshold by using a preset secret sharing algorithm to obtain a plurality of secret fragments, wherein the security threshold is less than or equal to the number of the secret fragments; and distributing the plurality of secret fragments to each relay node in a first relay node layer among preset M relay node layers, to transmit the plurality of secret fragments to a receiving device by means of each relay node in the M relay node layers, so that the receiving device can obtain the target secret information based on each received secret fragment under the condition that the number of the received secret fragments is greater than or equal to the security threshold;

wherein M is a positive integer, each relay node in each of the relay node layers is used to transmit the received secret fragments to a next hop device of the relay node, and the next hop device of the relay node is the receiving device or a relay node in a next relay node layer of the relay node.

According to the method described above, optionally, the preset secret sharing algorithm of the application processes the to-be-transmitted target secret information, to obtain a multiple of secret fragments, and includes:

randomly generating a secret curve of the target secret information based on the security threshold by using the secret sharing algorithm, wherein the number of security thresholds is greater than 1;

selecting a plurality of coordinate points from the secret curve, wherein the number of the plurality of coordinate points is greater than or equal to the security threshold; and using the plurality of selected coordinate points as the secret fragments of the target secret information.

According to the method described above, optionally, the plurality of secret fragments are distributed to each relay node in a first relay node layer among preset M relay node layers, so as to transmit the plurality of secret fragments to a receiving device by means of each relay node in the M relay node layers, and the process includes:

distributing each of the secret fragments to each relay node in the first relay node layer, such that each relay node in the first relay node layer obtains secret information of the relay node based on the secret fragment received by the relay node; in a case that the next hop device of the relay node is the receiving device, transmitting the secret information to the receiving device, so as to transmit the secret fragment to the receiving device; and in a case that the next hop device of the relay node is not the receiving device, processing the secret information by using the secret sharing algorithm, to obtain a plurality of secret fragments of the secret information, and distributing the plurality of secret fragments of the secret information to each relay node in the next relay node layer of the relay node, so as to transmit the secret information to the receiving device.

According to the method described above, optionally, to-be-transmitted target secret information is processed by using a preset secret sharing algorithm, to obtain a plurality of secret fragments, the method further includes:

assigning, for each relay node in the first relay node layer among the M relay node layers, a random key corresponding to the relay node according to a preset quantum key distribution method, and accordingly, the process of distributing the plurality of secret fragments to each relay node in a first relay node layer among preset M relay node layers comprises:

encrypting each of the secret fragments with the random key corresponding to each relay node in the first relay node layer, and transmitting each of the encrypted secret fragments to the relay node, which corresponds to the secret fragment, in the first relay node layer.

A data communication apparatus is applied to a transmitting device and includes:

a first execution unit, which is configured to process to-be-transmitted target secret information based on a set security threshold by using a preset secret sharing algorithm, to obtain a plurality of secret fragments; wherein the security threshold is less than or equal to the number of the secret fragments; and a transmitting unit, which is configured to distribute the plurality of secret fragments to each relay node in a first relay node layer among preset M relay node layers, to transmit the plurality of secret fragments to a receiving device by means of each relay node in the M relay node layers, so that the receiving device can obtain the target secret information based on each received secret fragment under the condition that the number of the received secret fragments is greater than or equal to the preset security threshold;

wherein M is a positive integer, each relay node in each of the relay node layers is configured to transmit the received secret fragment to a next hop device of the relay node; the next hop device of the relay node is the receiving device or each of relay nodes in a next relay node layer of the relay node.

A data communication method, which is applied to a receiving device and includes:

receiving each secret fragment transmitted by a transmitting device by means of each relay node in preset M relay node layers; wherein the secret fragments is obtained by the transmitting device by processing to-be-transmitted target secret information based on a set security threshold by using a preset secret sharing algorithm; and obtaining the target secret information based on each received secret fragment in the case that the number of the received secret fragments is greater than or equal to the security threshold;

wherein M is a positive integer, each relay node in each of the relay node layers is configured to transmit the received secret fragment to a next hop device of the relay node; the next hop device of the relay node is the receiving device or each relay node in a next relay node layer of the relay node, and the receiving device is a next hop device of each relay node in the M-th relay node layer among the M relay node layers.

A data communication apparatus, which is applied to a receiving device and includes:

a receiving unit, which is configured to receive each secret fragment transmitted by a transmitting device by means of each relay node in preset M relay node layers; each secret fragment is obtained by the transmitting device by processing to-be-transmitted target secret information based on a set security threshold by using a preset secret sharing algorithm; and a second execution unit, which is configured to obtain the target secret information based on each received secret fragment in the case that the number of the received secret fragments is greater than or equal to the security threshold;

wherein M is a positive integer, each relay node in each of the relay node layers is configured to transmit the received secret fragment to a next hop device of the relay node, the next hop device of the relay node is the receiving device or each relay node in a next relay node layer of the relay node, and the receiving device is a next hop device of each relay node in the M-th relay node layer among the M relay node layers.

A data communication system includes:

a transmitting device, M relay node layers, and a receiving device; wherein M is a positive integer, and each of the relay node layers comprises a plurality of relay nodes;

the transmitting device is configured to process to-be-transmitted target secret information based on a set security threshold by using a preset secret sharing algorithm, to obtain a plurality of secret fragments, and transmit the plurality of secret fragments to the receiving device by means of each relay node in the M relay node layers; and the receiving device is configured to obtain the target secret information based on each received secret fragment in the case that the number of the received secret fragments is greater than or equal to the security threshold, wherein each relay node in each of the relay node layers is configured to transmit the received secret fragment to a next hop device of the relay node; and the next hop device of the relay node is the receiving device or each relay node in a next relay node layer of the relay node.

According to the system described above, optionally, the relay node is specifically configured to obtain secret information of the relay node based on the secret fragment received by the relay node;

in the case that the next hop device of the relay node is the receiving device, the secret information is transmitted to the receiving device, so as to transmit the secret fragment to the receiving device; and in the case that the next hop device of the relay node is not the receiving device, the secret information is processed by using the secret sharing algorithm, to obtain a plurality of secret fragments of the secret information, and the plurality of secret fragments of the secret information are distributed to each relay node in the next relay node layer of the relay node.

According to the system, optionally, the transmitting device is further configured to assign, for each relay node in a first relay node layer among the M relay node layers, a random key corresponding to the relay node based on a preset quantum key distribution method, and trigger each of the relay nodes that have obtained the random keys to assign new random keys for the next hop device of the relay node based on the quantum key distribution method;

accordingly, the transmitting device is configured to encrypt each of the secret fragments using the random key corresponding to each relay node in the first relay node layer, and transmit each of the encrypted secret fragments to the relay node, which corresponds to the secret fragment, in the first relay node layer;

each of the relay nodes is configured to decrypt the received encrypted secret fragment based on a first random key of the relay node, to obtain secret information of the relay node;

in the case that the next hop device of the relay node is the receiving device, the relay node encrypts the secret information based on a second random key of the relay node, and transmits the encrypted secret information to the receiving device, so as to transmit the secret fragment to the receiving device;

in the case that the next hop device of the relay node is not the receiving device, the relay node encrypts the secret information, to obtain a plurality of encrypted secret fragments of the secret information, and the plurality of encrypted secret fragments of the secret information are distributed to each relay node in the next relay node layer of the relay node, wherein the first random key of each of the relay nodes is a random key assigned by a previous hop device of the relay node; the second random key of each of the relay nodes is a random key assigned by the relay node for the next hop device of the relay node; and the previous hop device of each of the relay nodes is the transmitting device or a relay node in a previous relay node layer of the relay node.

Compared with the prior art, the present invention includes the following advantages:

The present invention provides the data communication method, apparatus and system, and processes the to-be-transmitted target secret information based on the set security threshold by using the preset secret sharing algorithm, to obtain a plurality of secret fragments, divide the target secret information into the plurality of secret fragments for transmission, and distribute the plurality of secret fragments to each of the relay nodes, so that each of the relay nodes is unable to obtain a sufficient number of secret fragments, and in the case that the number of breached relay nodes is less than the security threshold, no breached relay nodes are unable to obtain a sufficient number of secret fragments to crack the target secret information, which may effectively guarantee the security of quantum relay communication.

BRIEF DESCRIPTION OF THE DRAWINGS

In order to more clearly describe the technical solutions of the embodiments of the present invention or in the prior art, drawings that are to be used to describe the embodiments or the prior art will be briefly introduced hereinafter. Apparently, the drawings described hereinafter merely illustrate some embodiments of the present invention, and a common technician in the art may also derive other drawings based on the drawings described herein without any creative effort.

DETAILED DESCRIPTION OF THE EMBODIMENTS

The technical solutions of the embodiments of the present invention will be clearly and completely described below with reference to the attached drawings of the embodiments of the present invention. Apparently, the embodiments described are merely a part of rather than all of the embodiments of the present invention. Based on the embodiments of the present invention, all other embodiments obtained by a common technician in the art without creative efforts shall fall within the scope of protection of the present invention.

In the present application, the terms "comprise", "include" or any other variants thereof are intended to cover non-exclusive inclusion, so that a process, method, article or device including a series of elements not only includes those elements, but also includes other elements not clearly listed, or also includes elements inherent to this process, method, article or device. Where there are no more constraints, an element prescribed by the phrase "comprises a" does not preclude the existence of additional identical elements in the process, method, article, or device that includes the element.

Figure 1:
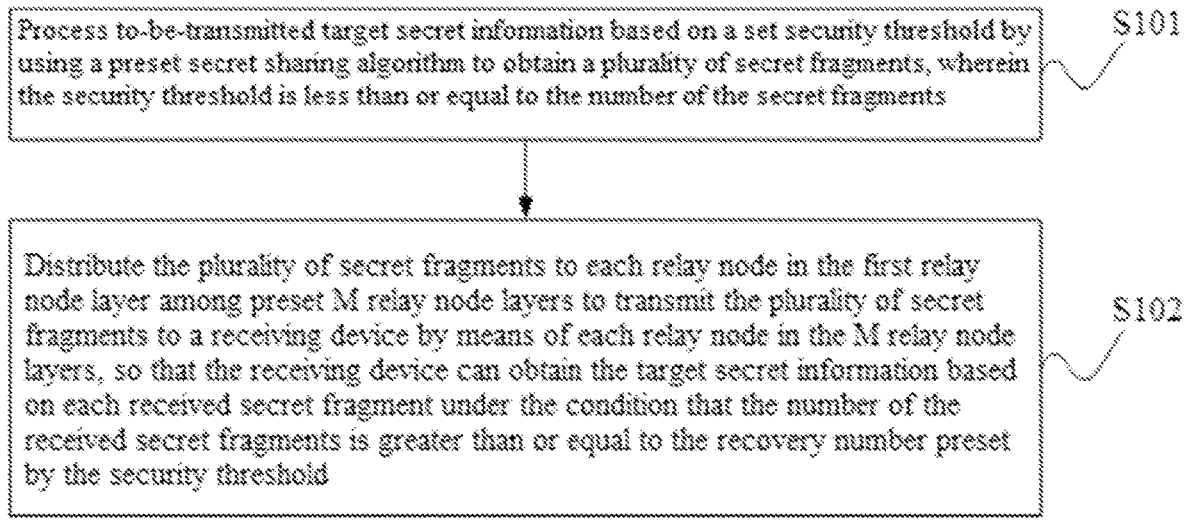
FIG. 1 is a flow diagram for a data communication method according to the present invention.

An embodiment of the present invention provides a data communication method. The method may be applied to a transmitting device, and a flow diagram of the method is shown in FIG. 1, and specifically includes:

S101: Process to-be-transmitted target secret information based on a set security threshold by using a preset secret sharing algorithm to obtain a plurality of secret fragments, wherein the security threshold is less than or equal to the number of the secret fragments.

The to-be-transmitted target secret information may be a quantum key or a communication message for direct quantum secure communication.

The to-be-transmitted target secret information may be processed by any secret sharing algorithm to obtain a plurality of secret fragments, for example, the secret sharing algorithm may be a Shamir secret sharing algorithm.

Specifically, the number N of the secret fragments obtained by encryption may be the number of relay nodes in a first relay node layer among preset M relay node layers, and any P secret fragments of the N secret fragments may recover the target secret information, where P is the preset security threshold, P≤N, and P and N are positive integers.

S102: Distribute the plurality of secret fragments to each relay node in the first relay node layer among the preset M relay node layers to transmit the plurality of secret fragments to a receiving device by means of each relay node in the M relay node layers, so that the receiving device can obtain the target secret information based on each received secret fragment under the condition that the number of the received secret fragments is greater than or equal to the security threshold.

Optionally, the plurality of secret fragments may be transmitted to the receiving device layer by layer by means of each relay node in the M relay node layers.

Wherein M is a positive integer. Each of the relay node layers includes a plurality of relay nodes, the number of the relay nodes in each of the relay node layers may be the same or different, and each relay node in each of the relay node layers transmits the secret fragment received to a next hop device of the relay node; the next hop device of the relay node is the receiving device or a relay node in a next relay node layer of the relay node.

Specifically, the number of secret fragments received by each next hop device is smaller than the security threshold.

Optionally, the next hop device of each relay node in the same relay node layer may be the same or different, the next hop device of each relay node in a target relay node layer may be one or more relay nodes of the next relay node layer of the relay node, and the relay node may receive one or more secret fragments; where the next hop device of the relay node of the target relay node layer is a relay node in the next relay node layer, the next hop device of each relay node in the target relay node layer may be different each other, and the target relay node layer may be any one of the M relay node layers except the M-th relay node layer.

Specifically, the receiving device may be a next hop device of each relay node of the M-th relay node layer among the M relay node layers.

Optionally, the number of secret fragments received by each relay node from a previous hop device of the relay node is less than the security threshold corresponding to the secret fragments, the relay nodes in each of the relay node layers may be isolated from each other, and the previous hop device of each relay node may be each relay node in a previous relay node layer of the relay node or the transmitting device.

The target secret information may be transmitted via a quantum communication channel, or transmitted via a classical optical-magnetic transmission channel.

By applying the data communication method provided by the present invention, the to-be-transmitted target secret information is processed based on the set security threshold by using the preset secret sharing algorithm, to obtain the plurality of secret fragments, and is divided into the plurality of secret fragments for transmission, and distribute the plurality of secret fragments to each of the relay nodes, so that each of the relay nodes is unable to obtain a sufficient number of secret fragments, and no breached relay node can obtain a sufficient number of secret fragments to crack the target secret information in the case that the number of breached relay nodes is less than the security threshold, which may effectively guarantee the security of quantum relay communication.

Figure 2:
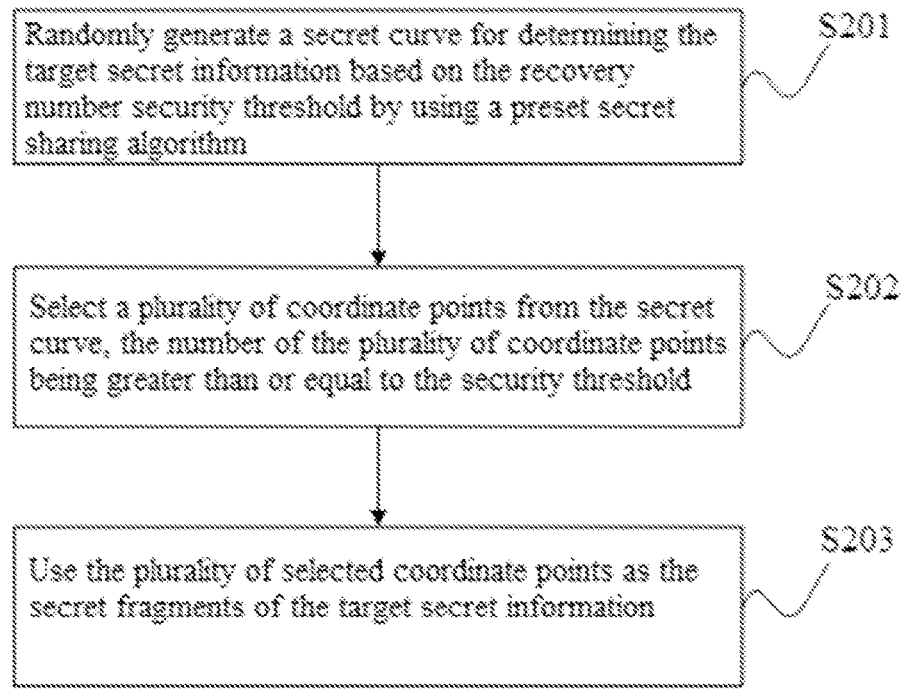
FIG. 2 is a flow diagram for a process for obtaining a plurality of secret fragments according to the present invention.

According to the method provided by the embodiment of the present invention, based on the implementation process described above, specifically, the to-be-transmitted target secret information is processed by using a preset secret sharing algorithm, to obtain a plurality of secret fragments, as shown in FIG. 2, and the method specifically includes:

S201: Randomly generate a secret curve of the target secret information based on the security threshold by using the secret sharing algorithm, wherein the security threshold is greater than 1.

In the method provided by the embodiment of the present invention, the security threshold may be set based on actual needs, and is denoted by t. The target secret information may be mapped into a preset two-dimensional space to obtain coordinates (0, y) of a two-dimensional space point of the target secret information. The secret curve may be a t-order curve passing through the point (0, y).

S202: Select a plurality of coordinate points from the secret curve; the number of the plurality of coordinate points is greater than or equal to the security threshold.

In the method provided by the embodiment of the present invention, a preset number N of coordinate points other than the point (0, y) may be selected from the secret curve; the preset number N may be equal to the number of relay nodes in the first relay node layer, so $1 < t \leq N$, where t and N are integers.

S203: Use the plurality of selected coordinate points as the secret fragments of the target secret information.

In the method provided by the embodiment of the present invention, by using the plurality of selected coordinate points as the secret fragments of the target secret information, thus, the secret curve may be calculated by means of any t secret fragments, so as to obtain the target secret information.

Figure 3:
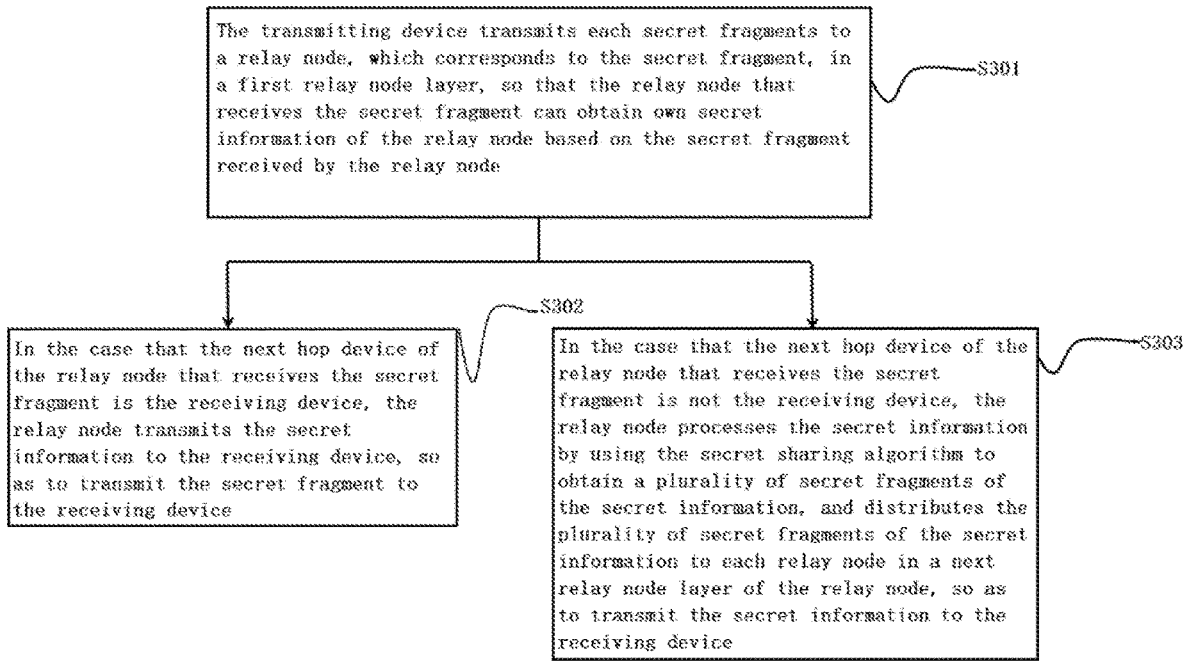
FIG. 3 is a flow diagram for a process for distributing secret fragments according to the present invention.

According to the method provided by the embodiment of the present invention, based on the implementation process described above, specifically, the plurality of secret fragments are distributed to each relay node in a first relay node layer among preset M relay node layers, to transmit the plurality of secret fragments to a receiving device by means of each relay node in the M relay node layers, as shown in FIG. 3; the process may include:

S301: The transmitting device transmits each of the secret fragments to a relay node, which corresponds to the secret fragment, in the first relay node layer, so that the relay node that receives the secret fragment can obtain own secret information of the relay node based on the secret fragment received by the relay node.

In the method provided by the embodiment of the present invention, each relay node may receive one or more secret fragments.

Optionally, the plurality of secret fragments transmitted by the transmitting device are in one-to-one correspondence with each relay node in the first relay node layer.

Wherein, the relay node in the first relay node layer that receives the secret fragment obtains own secret information of the relay node based on the secret fragment received by the relay node, and the secret information may include the secret fragment.

S302: In the case that the next hop device of the relay node that receives the secret fragment is the receiving device, the relay node transmits the secret information to the receiving device, so as to transmit the secret fragment to the receiving device.

Specifically, if the next hop device of the relay node is the receiving device, it indicates that M=1, that is, there is only one relay node layer; in this case, each relay node in the relay node layer may transmit the received secret information to the receiving device.

S303: In the case that the next hop device of the relay node that receives the secret fragment is not the receiving device, the relay node processes the secret information by using the secret sharing algorithm to obtain a plurality of secret fragments of the secret information, and distributes the plurality of secret fragments of the secret information to each relay node in the next relay node layer of the relay node, so as to transmit the secret information to the receiving device.

If the next hop device of the relay node is not the receiving device, it indicates that M≥2, that is, there are a plurality of relay node layers. In this case, each relay node in the first relay node layer may process the secret information of the relay node by using the secret sharing algorithm to obtain a plurality of secret fragments of the secret information of the relay node, where the number of the obtained secret fragments may be the number of relay nodes in the next relay node layer of the relay node; and the plurality of secret fragments of the secret information are distributed to each relay node in the next relay node layer of the relay node, and transmitted by each relay node, until each relay node in the M-th relay node layer transmits the secret information received thereby to the receiving device.

By applying the method provided by the embodiment of the present invention, the secret information of each relay node may be transmitted backward by means of the plurality of secret fragments, which makes it difficult for an attacker to obtain a sufficient number of secret fragments to obtain the target secret information.

Figure 4:
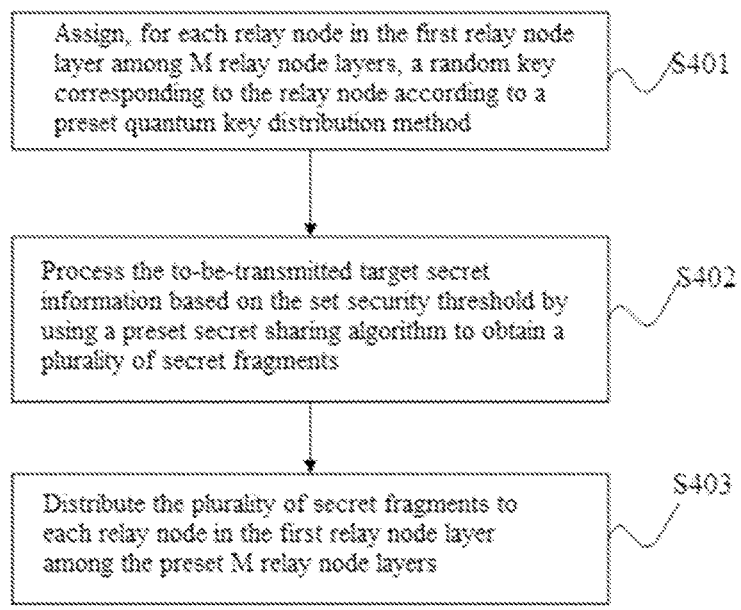
FIG. 4 is another flow diagram for a data communication method according to the present invention.

In an embodiment provided by the present invention, as shown in FIG. 4, which is another flow diagram of the data communication method according to the present invention, the method may include:

S401: Assign, for each relay node in the first relay node layer among the M relay node layers, a random key corresponding to the relay node according to a preset quantum key distribution method.

The random keys received by each relay node in the first relay node layer are different from one another. Each random key assigned by the transmitting device is saved by the transmitting device and by the relay node that receives the random key, and the relay node uses the random key received thereby as a first random key.

S402: Process the to-be-transmitted target secret information based on the set security threshold by using the preset secret sharing algorithm to obtain a plurality of secret fragments.

The execution process and execution principle of S402 are consistent with those of S101, which will not be repeated herein.

S403: Distribute the plurality of secret fragments to each relay node in the first relay node layer among the preset M relay node layers.

The execution process and execution principle of S403 are consistent with those of S102, which may be cross-referenced.

Optionally, one feasible implementation of distributing the plurality of secret fragments to each relay node in the first relay node layer among the preset M relay node layers includes: encrypt each of the secret fragments with the random key corresponding to each relay node in the first relay node layer, and transmit each of the encrypted secret fragments to each relay node in the first relay node layer.

Optionally, for each relay node in the first relay node layer among the M relay node layers, the random key corresponding to the relay node is assigned according to the preset quantum key distribution method, and each of the relay nodes that have obtained the random keys is triggered to assign new random keys for the next hop device of the relay node according to the quantum key distribution method.

Specifically, each relay node, upon receiving the encrypted secret fragment transmitted by the transmitting device, may decrypt the secret fragment with the random key pre-assigned by the transmitting device, to obtain the secret fragment, and obtain the secret information of the relay node based on the secret fragment; each relay node in the first relay node layer may determine the secret fragment as the secret information thereof.

By applying the method provided by the embodiment of the present invention, the random key may be assigned through the quantum key distribution method, and then to-be-transmitted the secret fragment is encrypted with the random key, which may further guarantee that the target secret information is not cracked.

Figure 5:
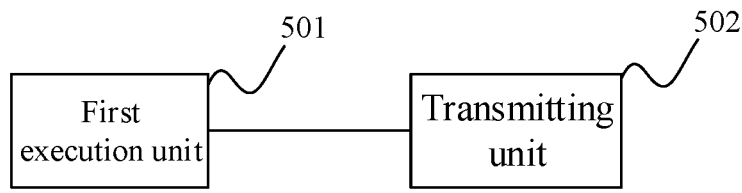
FIG. 5 is a structural diagram for a data communication apparatus according to the present invention.

Corresponding to the method described in FIG. 1, an embodiment of the present invention further provides a data communication apparatus for specific implementation of the method in FIG. 1. The data communication apparatus provided by the embodiment of the present invention may be applied to a transmitting device, with a structural diagram of the apparatus as shown in FIG. 5, and specifically includes:

a first execution unit 501 configured to process to-be-transmitted target secret information based on a set security threshold by using a preset secret sharing algorithm, to obtain a plurality of secret fragments; wherein the security threshold is less than or equal to the number of the secret fragments; and a transmitting unit 502 configured to distribute the plurality of secret fragments to each relay node in a first relay node layer among preset M relay node layers, to transmit the plurality of secret fragments to a receiving device by means of each relay node in the M relay node layers, so that the receiving device can obtain the target secret information based on each received secret fragment under the condition that the number of the received secret fragments is greater than or equal to the security threshold;

wherein M is a positive integer, each relay node in each of the relay node layers is configured to transmit the received secret fragment to a next hop device of the relay node, and the next hop device of the relay node is the receiving device or each relay node in a next relay node layer of the relay node.

The specific principles and execution processes of each unit and module in the data communication apparatus applied to the transmitting device disclosed in the above-mentioned embodiments of the present invention are the same as those of the data communication method applied to the transmitting device disclosed in the above-mentioned embodiments of the present invention, and the corresponding parts of the data communication method provided in the above-mentioned embodiments of the present invention may be referred to, which will not be repeated herein.

Figure 6:
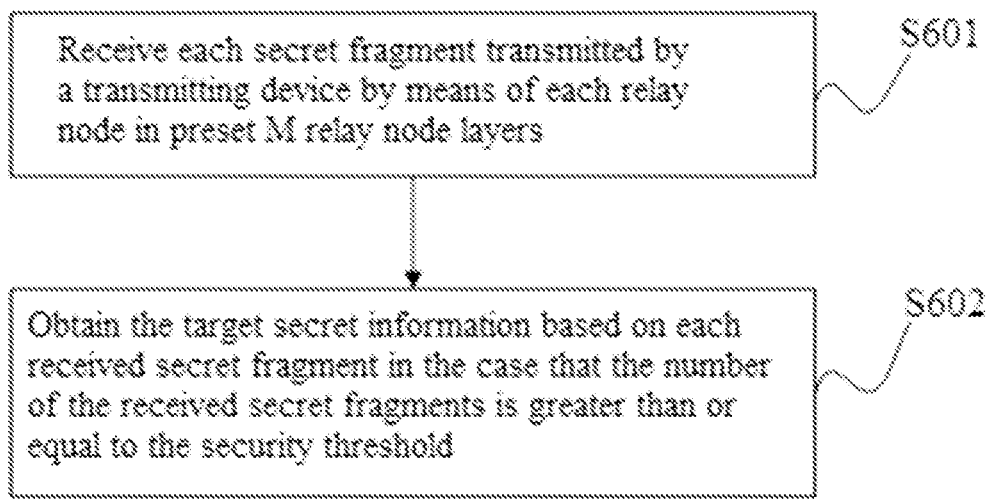
FIG. 6 is a flow diagram for yet another data communication method according to the present invention.

In an embodiment of the present invention, another data communication method is provided. The method is applied to a receiving device, has a flow diagram as shown in FIG. 6, and specifically includes:

S601: Receive each secret fragment transmitted by a transmitting device by means of each relay node in preset M relay node layers, the secret fragments being obtained by the transmitting device by processing to-be-transmitted target secret information based on a set security threshold by using a preset secret sharing algorithm.

The receiving device receives a secret fragment transmitted by each relay node in the M-th relay node layer among the M relay node layers.

Specifically, the received secret fragment may be an unencrypted secret fragment or an encrypted secret fragment. If the received secret fragment is an encrypted secret fragment, the encrypted secret fragment may be decrypted based on a random key pre-assigned by the relay node that transmits the secret fragment, so as to obtain a decrypted secret fragment.

Optionally, in the case that M≥2, the secret fragment transmitted by the transmitting device may be recovered by the receiving device based on each secret fragment in the M-th relay node layer.

S602: Obtain the target secret information based on each received secret fragment in the case that the number of the received secret fragments is greater than or equal to the security threshold, wherein M is a positive integer, each relay node in each of the relay node layers is configured to transmit the received secret fragment to a next hop device of the relay node; the next hop device of the relay node is the receiving device or each relay node in a next relay node layer of the relay node, and the receiving device is a next hop device of each relay node in the M-th relay node layer among the M relay node layers.

In the method provided by the embodiment of the present invention, when the number of the received secret fragments is greater than or equal to the security threshold, the receiving device may obtain a secret curve through calculation based on the received secret fragments, so as to obtain the target secret information.

Wherein, one feasible implementation of obtaining the target secret information based on each of the received secret fragments is to: select a plurality of secret fragments with the number consistent with security thresholds among the received secret fragments, and use the plurality of selected secret fragment for decoding, to obtain the target secret information. Optionally, the plurality of selected secret fragments may be used for decoding based on a Lagrangian interpolation method, so as to obtain the target secret information.

Optionally, in the case that the number of the received secret fragments is greater than or equal to the security threshold t, may select a plurality of secret fragment groups among the received secret fragments, each of the secret fragment groups includes t secret fragments, and all secret fragment groups are different. Each of the secret fragment groups is used for decoding, to obtain to-be-verified secret information corresponding to the secret fragment group, if each of the secret fragment groups corresponds to the consistent to-be-verified secret information, the to-be-verified secret information may be determined as the target secret information.

If at least one pair of different to-be-verified secret information is present in the to-be-verified secret information corresponding to each of the secret fragment groups, a dishonest relay node may be determined and an alarm operation may be performed. The number of consistent to-be-verified secret information in all the to-be-verified secret information may also be determined, and the to-be-verified secret information with the highest number of consistent information is determined as the target secret information.

By applying the method provided by the embodiment of the present invention, the target secret information may be restored based on the secret fragments in the case that the number of the secret fragments received by the receiving device is greater than or equal to the preset security threshold, which may effectively guarantee the transmission security of the target secret information.

Figure 7:
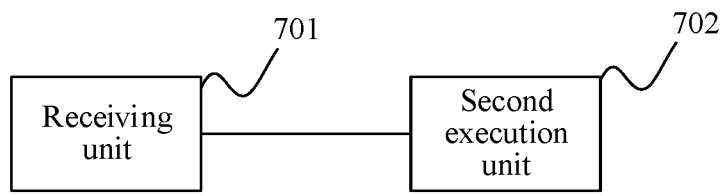
FIG. 7 is a structural diagram for another data communication apparatus according to the present invention.

Corresponding to the method described in FIG. 6, an embodiment of the present invention further provides a data communication apparatus for specific implementation of the method in FIG. 6. The data communication apparatus provided by the embodiment of the present invention may be applied to a receiving device, with a structural diagram of the apparatus as shown in FIG. 7, and specifically includes:

a receiving unit 701 configured to receive each secret fragment transmitted by a transmitting device by means of each relay node in preset M relay node layers, the secret fragments being obtained by the transmitting device by processing to-be-transmitted target secret information based on a set security threshold by using a preset secret sharing algorithm; and a second execution unit 702 configured to obtain the target secret information based on each received secret fragment in the case that the number of the received secret fragments is greater than or equal to the security threshold;

wherein M is a positive integer, each relay node in each of the relay node layers is configured to transmit the received secret fragment to a next hop device of the relay node, the next hop device of the relay node is the receiving device or each relay node in a next relay node layer of the relay node, and the receiving device is a next hop device of each relay node in the M-th relay node layer among the M relay node layers.

The specific principles and execution processes of each unit and module in the data communication apparatus applied to the receiving device disclosed in the above-described embodiments of the present invention are the same as those of the data communication method applied to the receiving device disclosed in the above-described embodiments of the present invention, and the corresponding portions of the data communication method provided in the above-described embodiments of the present invention may be referred to, which will not be repeated herein.

Figure 8:
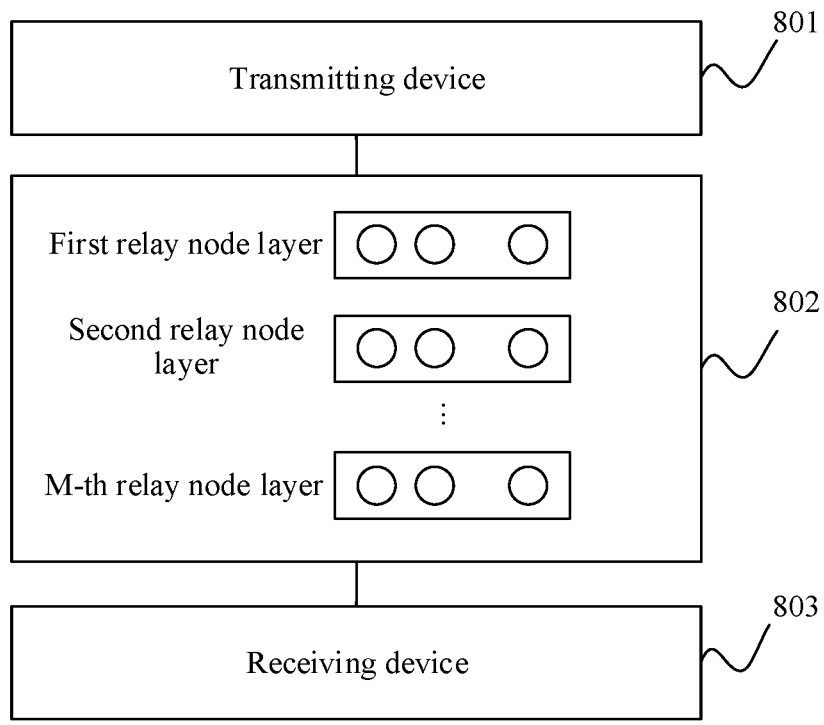
FIG. 8 is a structural diagram for a data communication system according to the present invention.

In an embodiment of the present invention, a data communication system is provided, with a structural diagram of the data communication system shown in FIG. 8, and the system specifically includes:

a transmitting device 801, M relay node layers 802, and a receiving device 803, M being a positive integer, and each of the relay node layers including a plurality of relay nodes.

The transmitting device 801, which is configured to process to-be-transmitted target secret information by using a preset secret sharing algorithm to obtain a plurality of secret fragments, and transmit the plurality of secret fragments to the receiving device by means of each relay node in the M relay node layers 802.

The receiving device 803, which is configured to obtain the target secret information based on each received secret fragment in the case that the number of the received secret fragments is greater than or equal to the security threshold.

Each relay node in each of the relay node layers is configured to transmit the received secret fragment to a next hop device of the relay node; the next hop device of the relay node is the receiving device 803 or each relay node in a next relay node layer of the relay node.

Each relay node is configured to receive a secret fragment transmitted by a previous hop device thereof; the previous hop device is the transmitting device 801 or each relay node in a previous relay node layer of the relay node. The secret fragment may be an unencrypted secret fragment or an encrypted secret fragment.

Each relay node is configured to transmit the received secret fragment to the next hop device of the relay node; the next hop device is the receiving device 803 or each relay node in a next relay node layer of a target relay node; there are various implementations of transmitting the received secret fragment to the next hop device of the relay node.

In one feasible implementation, the received secret fragment may be transmitted directly to the next hop device of the relay node.

In another feasible implementation, the received secret fragment may be encrypted with a random key pre-assigned for the next hop device, and the encrypted random key is transmitted to the next hop device.

In yet another feasible implementation, the received secret fragment may be used as secret information of the relay node, the secret information is processed by using the preset secret sharing algorithm, to obtain each secret fragment of the secret information, and each secret fragment of the secret information is transmitted to corresponding next hop device.

In yet another feasible implementation, the received secret fragment may be used as secret information of the relay node, the secret information is processed by using the preset secret sharing algorithm, to obtain each secret fragment of the secret information, each secret fragment of the secret information is encrypted with a random key pre-assigned for the next hop device, and each encrypted secret fragment of the secret information is transmitted to corresponding next hop device.

Optionally, each relay node is configured to assign a new random key for the next hop device of the relay node in the case of receiving the random key transmitted by the previous hop device of the relay node.

In an embodiment provided by the present invention, based on the above-described solution, optionally, the relay node in the data communication system is specifically configured to obtain secret information of the relay node based on the secret fragment received by the relay node.

In the case that the next hop device of the relay node is the receiving device, the secret information is transmitted to the receiving device 803, so as to transmit the secret fragment to the receiving device 803.

In the case that the next hop device of the relay node is not the receiving device 803, the secret information is processed by using the secret sharing algorithm, to obtain a plurality of secret fragments of the secret information, and the plurality of secret fragments of the secret information are distributed to each relay node in a next relay node layer of the relay node.

Each relay node in the first relay node layer of the M relay node layers 802 may use the received secret fragment as the secret information thereof.

Each relay node in the M relay node layers 802 other than the first relay node layer may receive each secret fragment transmitted by each relay node in the previous relay node layer of the relay node, and calculate each received secret fragment, to obtain the secret information thereof.

In one embodiment provided by the present invention, based on the above solutions, optionally, the transmitting device in the data communication system is further configured to assign, for each relay node in the first relay node layer among the M relay node layers, a random key corresponding to the relay node according to a preset quantum key distribution method, and trigger each of the relay nodes that have obtained the random keys to assign new random keys for the next hop device of the relay node according to the quantum key distribution method.

Accordingly, the transmitting device is configured to encrypt each of the secret fragments with the random key corresponding to each relay node in the first relay node layer, and transmit each of the encrypted secret fragments to the relay node in the first relay node layer corresponding to the secret fragment.

Each of the relay nodes is configured to decrypt the received encrypted secret fragment based on a first random key of the relay node, to obtain secret information of the relay node.

In the case that the next hop device of the relay node is the receiving device, the relay node encrypts the secret information based on a second random key of the relay node, and transmits the encrypted secret information to the receiving device, so as to transmit the secret fragment to the receiving device.

In the case that the next hop device of the relay node is not the receiving device, the relay node encrypts the secret information to obtain a plurality of encrypted secret fragments of the secret information, and distributes the plurality of encrypted secret fragments of the secret information to each relay node in the next relay node layer of the relay node.

The first random key of each of the relay nodes is a random key assigned by a previous hop device of the relay node. The second random key of each of the relay nodes is a random key assigned by the relay node for the next hop device of the relay node. The previous hop device of each of the relay nodes is the transmitting device or each relay node in a previous relay node layer of the relay node.

In the system provided by the embodiment of the present invention, each relay node is configured to assign a new random key for the next hop device of the relay node in the case of receiving the random key transmitted by the previous hop device thereof. Each relay node in the first relay node layer among the M relay node layers may decrypt the received encrypted secret fragment based on the random key assigned by the transmitting device, and use the decrypted secret fragment as the secret information thereof.

Each relay node in the M relay node layers other than the first relay node layer may receive each encrypted secret fragment transmitted by each relay node in the previous relay node layer of the relay node, decrypt each encrypted secret fragment based on the random key pre-assigned by each relay node in the previous relay node layer, to obtain each decrypted secret fragment, and calculate each decrypted secret fragment, to obtain the secret information of the relay node.

The data communication system provided by the embodiment of the present invention may be used in a variety of implementation scenarios during practical application. For example, the system may be used in a quantum key distribution solution implementation scenario (to distribute random keys), a quantum secure direct communication scenario (to transmit deterministic information), and a single photon- or weak pulse-based quantum communication solution implementation scenario.

Figure 9:
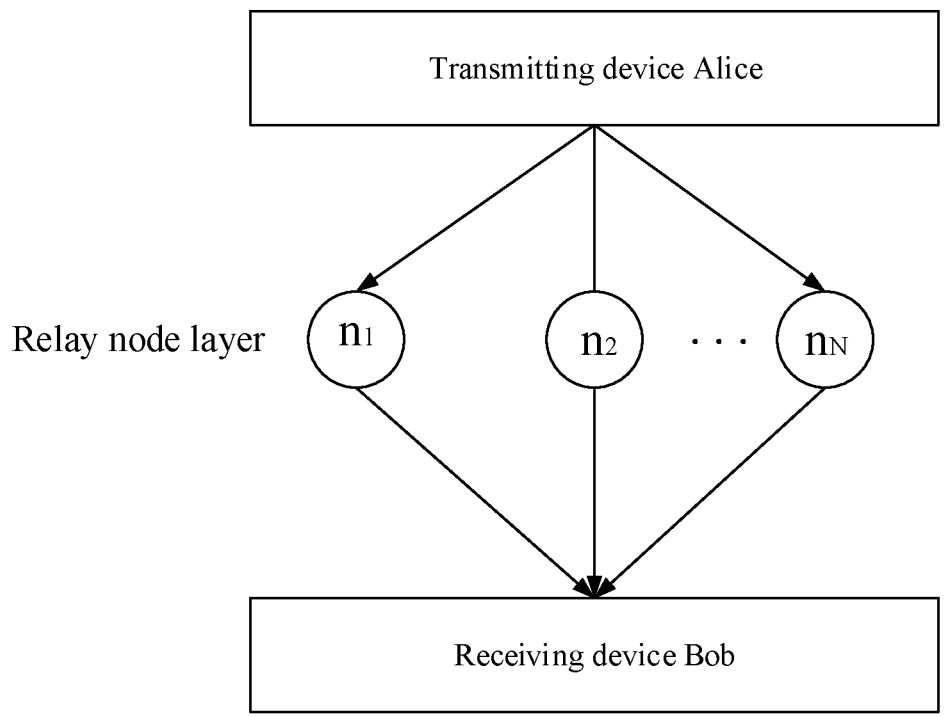
FIG. 9 is another schematic structural diagram for a data communication system according to the present invention.

In a quantum communication scenario with a small scale, M=1 may be set up, that is, one relay node layer is provided, and then a structural diagram of the quantum communication system is shown in FIG. 9. The transmitting device distributes the secret fragments to each relay node, and each relay node transmits the secret fragments to the receiving device.

In the case that M=1, the specific implementation scheme of the data communication system applied to the implementation scenario of quantum key distribution solution is as follows:

Step A1: The transmitting device Alice distributes random keys $K_{a1}, K_{a2}, \ldots, K_{an}$ to the relay nodes $n_1, n_2, \ldots, n_N$ through quantum key distribution, where each random key $K_{ai}$ is held by Alice and the node $n_i$, and i=1, 2, . . . , N.

Step A2: The relay nodes $n_1, n_2, \ldots, n_N$ distribute random keys $K_{b1}, K_{b2}, \ldots, K_{bN}$ to the receiving device Bob through quantum key distribution, where each random key $K_{bi}$ is held by Bob and the node $n_i$.

Step A3: Alice generates a key y randomly, sets a threshold t<=N (the number of nodes) through the Shamir secret sharing algorithm, selects an appropriate t-order curve, and generates secret fragments $(x_1, y_1), (x_2, y_2), \ldots, (x_N, y_N)$, where $y_i$ needs to be kept secret and $x_i$ may be public.

Step A4: Alice adopts a solution of setting one secret at a time and transmits $(x_1, y_1+K_{a1}), (x_2, y_2+K_{a2}), \ldots, (x_N, y_N+K_{aN})$ to the relay nodes $n_1, n_2, \ldots, n_N$ respectively.

Step A5: Each relay node $n_i$ decrypts $y_i$ with the random key $K_{ai}$ thereof and then transmits $(x_i, y_i+K_{bi})$ thereof to Bob.

Step A6: Bob decrypts $y_i$ transmitted by each node with the key $K_{bi}$ thereof, and finally obtains $(x_1, y_1), (x_2, y_2), \ldots, (x_N, y_N)$.

Step A7: Whether each relay node, Alice and Bob are honest is checked, and in the case that the number of honest relay nodes in the middle is greater than or equal to the threshold t, that is, the number of valid secret fragments is t, Bob may obtain the random key y of Alice through a preset first decoding formula, and any malicious node or eavesdropper may not obtain any information about y.

The first decoding formula is:

$$y = F(0) = \sum_i y_i \frac{\prod_j x_j}{\prod_j (x_i - x_j)}.$$

Wherein whether the transmitting device, each relay node, and the receiving device are honest may be detected, and if there is any dishonest node, an alarm operation may be performed. The specific detection method may include: 1. A channel may be subjected to quantum communication security detection before the transmitting device transmits the target secret information, so as to obtain a channel detection error rate, where the channel detection error rate is greater than a set error rate threshold, it indicates that the communication is eavesdropped, that is, a dishonest node is present. 2. In order to determine whether the relay nodes are honest, data received by the relay nodes may be used for the next round of transmission and computation. This may be achieved by comparing calculation results of different t groups of nodes of n nodes to verify the consistency, or by Verifiable secret sharing, such as a Feldman secret sharing solution.

In one feasible solution, M=1, and a specific implementation scheme of the data communication system applied to the quantum secure direct communication scenario is as follows:

Step B1: The transmitting device Alice wishes to transmit the secret information y, sets a threshold t<=N (the number of nodes) through the Shamir secret sharing algorithm, selects an appropriate t-order curve, and generates $(x_1, y_1)$, $(x_2, y_2)$, ..., $(x_N, y_N)$, where $y_i$ needs to be kept secret and $x_i$ may be public.

Step B2: Alice securely transmits $(x_1, y_1)$, $(x_2, y_2)$, ..., $(x_N, y_N)$ to the relay nodes $n_1, n_2, ..., n_N$ respectively through quantum secure direct communication, where each $(x_i, y_i)$ is known only to Alice and the node $n_i$.

Step B3: The relay nodes $n_1, n_2, ..., n_N$ securely transmit $(x_1, y_1)$, $(x_2, y_2)$, ..., $(x_N, y_N)$ to the receiving device Bob respectively through quantum secure direct communication, where each $(x_i, y_i)$ is known only to Bob and the node $n_i$.

Step B4: Whether each relay node, Alice and Bob are honest is checked, and as long as the number of honest relay nodes in the middle is greater than or equal to the threshold t, that is, the number of valid secret fragments is t, Bob may obtain the secret information y of Alice through the above first decoding formula, and any malicious node or eavesdropper may not obtain any information about y.

Figure 10:
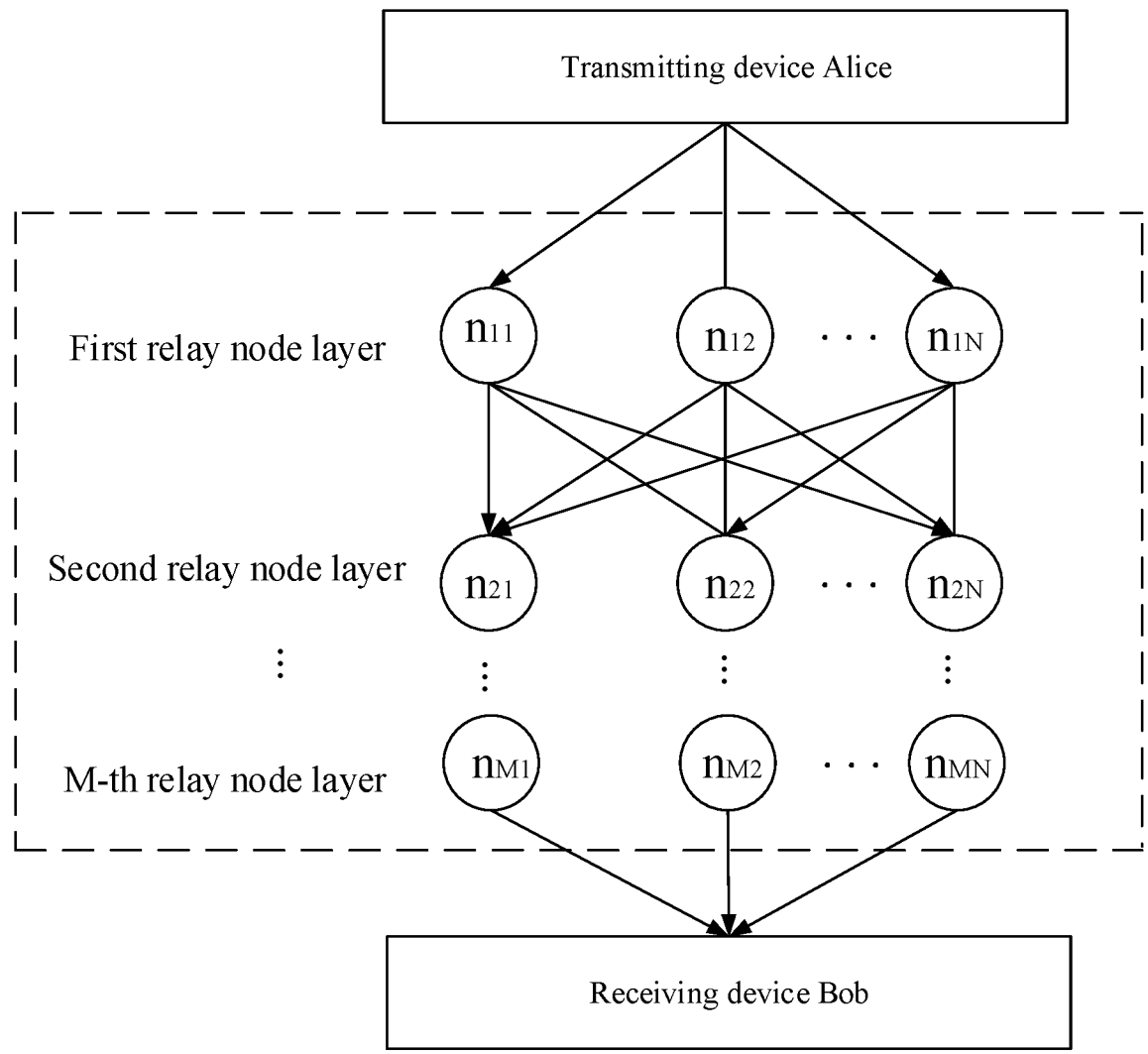
FIG. 10 is yet another structural diagram for a data communication system according to the present invention.

In a quantum communication scenario with a large scale, M≥2 may be set up, that is, a plurality of relay node layers are set up to achieve long-distance secure quantum communication, and then a structural diagram of the quantum communication system is shown in FIG. 10. The transmitting device transmits the secret fragments to the receiving device through each relay node in the M-th relay node layer.

Next, the quantum key distribution implementation scenario and the quantum secure direct communication scenario are illustrated as examples.

In one feasible solution, M≥2, and a specific implementation process of the data communication system applied to the quantum key distribution solution implementation scenario is as follows:

Step C1: The transmitting device Alice distributes random keys $K_{a11}, K_{a12}, ..., K_{a1N}$ to relay nodes $n_{11}, n_{12}, ..., n_{1N}$ in the first relay node layer through quantum key distribution, where each random key $K_{a1j}$ is held by Alice and a node $n_{ij}$, and j=1, 2, ..., N.

Step C2: Starting from the relay nodes in the first relay node layer, the j-th relay node $n_{ij}$ in the i-th layer distributes random keys $K_{ij1}, K_{ij2}, ..., K_{ijN}$ through quantum key distribution, where each key $K_{ijk}$ is held by the j-th relay node $n_{ij}$ in the i-th layer and a k-th relay node $n_{(i+1)k}$ in an (i+1)th layer.

Step C3: The relay nodes $n_{M1}, n_{M2}, ..., n_{MN}$ in the M-th relay node layer distribute random keys $K_{bM1}, K_{bM2}, ..., K_{bMN}$ to the receiving device Bob, where each key $K_{bMi}$ is held by Bob and a node $n_{Mi}$.

Step C4: Alice generates a key y randomly, sets a threshold t<=N (the number of nodes) through the Shamir secret sharing algorithm, selects an appropriate t-order curve, and generates $(x_1, y_1)$, $(x_2, y_2)$, ..., $(x_N, y_N)$, where $y_i$ needs to be kept secret, $x_i$ may be public, and then the i-th node in each layer may use $x_i$ as an x value of the secret sharing algorithm.

Step C5: Alice adopts a solution of one secret at a time, to transmit $(x_1, y_1+K_{a11})$, $(x_2, y_2+K_{a12})$, ..., $(x_N, y_N+K_{a1N})$ to the relay nodes $n_{11}, n_{12}, ..., n_{1N}$ in the first relay node layer respectively.

Step C6: A relay node $n_{ij}$ in the first relay node layer decrypts out $y_{1j=yj}$ with a key $K_{a1j}$ thereof. Note that in this case, $y_{ij}$ satisfies the following condition and may reduce y (of course, no node is able to reduce y for the time being since no party knows enough $y_{ij}$).

Step C7: In the M relay node layers, the secret fragments are transmitted from the relay nodes in the i-th layer to the relay nodes in the (i+1)th layer, with the specific transmitting process as follows:

a. The j-th node $n_{ij}$ in the i-th layer has a secret $y_{ij}$, and generates $(x_1, y_{ij1})$, $(x_2, y_{ij2})$, ..., $(x_N, y_{ijN})$ through the Shamir secret sharing algorithm and also by using the threshold t and the same x value, where $y_{ijk}$ needs to be kept secret.

b. The j-th node $n_{ij}$ in the i-th layer transmits $(x_1, y_{ij1}+K_{ij1})$, $(x_2, y_{ij2}+K_{ij2})$, ..., $(x_N, y_{ijN}+K_{ijN})$ to nodes $n_{(i+1)1}, n_{(i+1)2}, ..., n_{(i+1)N}$ in the (i+1)th layer respectively.

c. The k-th node $n_{(i+1)k}$ of the (i+1)th layer waits to receive $(x_1, y_{ik1}+K_{ik1})$, $(x_2, y_{ik2}+K_{ik2})$, ..., $(x_N, y_{ikN}+K_{ikN})$ transmitted from all the nodes of the i-th layer. Since the node $n_{(i+1)k}$ knows the random keys $K_{ik1}, K_{ik2}, ..., K_{ikN}$, the node may decrypt out $(x_1, y_{ik1})$, $(x_2, y_{ik2})$, ..., $(x_N, y_{ikN})$.

d. The k-th node $n_{(i+1)k}$ of the (i+1)th layer calculates a secret $y_{(i+1)k}$ thereof by using a second decoding formula, and the second decoding formula is as follows:

$$y_{(i+1)k} = \sum_l y_{ilk} \frac{\prod_s x_s}{\prod_s (x_l - x_s)}.$$

The correctness of the above formula lies in the fact that, according to induction, the secret $y_{ij}$ of each node in the i-th layer satisfies the following equation:

$$y = \sum_l y_{il} \frac{\prod_s x_s}{\prod_s (x_l - x_s)};$$

According to the Shamir secret sharing algorithm, by substituting the above formula to exchange the summation notation, the following formula may be obtained:

$$y = \sum_l \left[ \sum_k y_{ilk} \frac{\prod_r x_r}{\prod_r (x_k - x_s)} \right] \frac{\prod_s x_s}{\prod_s (x_l - x_s)} =$$

-continued $$\sum_{k}\left[\sum_{l}y_{ikl}\frac{\prod_{s}x_{s}}{\prod_{s}(x_{l}-x_{s})}\right]\frac{\prod_{r}x_{r}}{\prod_{r}(x_{k}-x_{r})}=\sum_{k}y_{(i+1),k}\frac{\prod_{s}x_{s}}{\prod_{s}(x_{k}-x_{s})}.$$

It can be seen that $(x_1, y_{(i+1)k1})$, $(x_2, y_{(i+1)k2})$, ..., $(x_N, y_{(i+1)kN})$ may reduce y. Since no relay node knows enough $y_{(i+1)k}$, no relay node may reduce y.

Step C8: The relay nodes $n_{M1}, n_{M2}, \ldots, n_{MN}$ of the M-th relay node layer encode secrets and keys thereof and then transmit $(x_1, y_{M1+Kb1})$, $(x_2, y_{M2+Kb2})$, ..., $(x_N, y_{MN+KbN})$ to the receiving device Bob.

Step C9: Bob obtains $(x_1, y_{M1})$, $(x_2, y_{M2})$, ..., $(x_N, y_{MN})$ by decoding with the random keys Bob knows.

Step C10: Whether each relay node, Alice and Bob are honest is checked, and as long as the number of honest relay nodes in the middle is greater than or equal to the threshold t, Bob may obtain the random key y of Alice through a third decoding formula, and any malicious node or eavesdropper may not obtain any information about y. The third decoding formula is:

$$y=F(0)=\sum_{i}y_{Mi}\frac{\prod_{j}x_{j}}{\prod_{j}(x_{i}-x_{j})}.$$

In one feasible solution, M≥2, and a specific implementation process of the data communication system applied to the quantum secure direct communication scenario is as follows:

Step D1: The transmitting device Alice wishes to transmit the secret information y, sets a threshold t<=N (the number of nodes) through the Shamir secret sharing algorithm, selects an appropriate t-order curve, and generates $(x_1, y_1)$, $(x_2, y_2)$, ..., $(x_N, y_N)$, where $y_i$ needs to be kept secret and $x_i$ may be public.

Step D2: The transmitting device Alice securely transmits $(x_1, y_1)$, $(x_2, y_2)$, ..., $(x_N, y_N)$ to the relay nodes $n_{11}, n_{12}, \ldots, n_{1N}$ of the first relay node layer through quantum secure direct communication, and discloses $x_1, x_2, \ldots, x_N$.

Step D3: A secret of a relay node $n_{1i}$ of the first relay node layer is defined as $y_{1i=yi}$. In this case, $y_{1i}$ may reduce y based on a fourth decoding formula as follows. Since no party knows enough $y_{1i}$, no node may reduce y. The fourth decoding formula is:

$$y=\sum_{i}y_{1i}\frac{\prod_{j}x_{j}}{\prod_{j}(x_{i}-x_{j})}.$$

Step D4: In the M relay node layers, the secret fragments are transmitted from the relay nodes in the i-th layer to the relay nodes in the (i+1)th layer, with specific transmitting process as follows:

1. The j-th node $n_{ij}$ in the i-th layer has the secret $y_{ij}$, and generates $(x_1, y_{ij1})$, $(x_2, y_{ij2})$, ..., $(x_N, y_{ijN})$ through the Shamir secret sharing algorithm and also by using the threshold t and the same x value, where $y_{ijk}$ needs to be kept secret.

2. The j-th node $n_{ij}$ in the i-th layer transmits $(x_1, y_{ij1})$, $(x_2, y_{ij2})$, ..., $(x_N, y_{ijN})$ to the nodes $n_{(i+1)1}, n_{(i+1)2}, \ldots, n_{(i+1)N}$ in the (i+1)th layer respectively through quantum secure direct communication.

3. The k-th node $n_{(i+1)k}$ of the (i+1)th layer waits to receive $(x_1, y_{ik1})$, $(x_2, y_{ik2})$, ..., $(x_N, y_{ikN})$ transmitted from all nodes in the i-th layer.

4. The k-th node $n_{(i+1)k}$ of the (i+1)th layer calculates a secret $y_{(i+1)k}$ thereof by using a fifth decoding formula, and the fifth decoding formula is as follows:

$$y_{(i+1),k}=\sum_{l}y_{ilk}\frac{\prod_{s}x_{s}}{\prod_{s}(x_{l}-x_{s})}.$$

The correctness of the above formula lies in the fact that, according to induction, the secret $y_{ij}$ of each node in the i-th layer satisfies:

$$y=\sum_{l}y_{il}\frac{\prod_{s}x_{s}}{\prod_{s}(x_{l}-x_{s})}.$$

According to the Shamir secret sharing algorithm, by substituting the above formula to exchange the summation notation, the following may be obtained:

$$y=\sum_{l}\left[\sum_{k}y_{ilk}\frac{\prod_{r}x_{r}}{\prod_{r}(x_{k}-x_{s})}\right]\frac{\prod_{s}x_{s}}{\prod_{s}(x_{l}-x_{s})}=$$

$$\sum_{k}\left[\sum_{l}y_{ikl}\frac{\prod_{s}x_{s}}{\prod_{s}(x_{l}-x_{s})}\right]\frac{\prod_{r}x_{r}}{\prod_{r}(x_{k}-x_{r})}=\sum_{k}y_{(i+1),k}\frac{\prod_{s}x_{s}}{\prod_{s}(x_{k}-x_{s})}.$$

It can be seen that $(x_1, y_{(i+1)k1})$, $(x_2, y_{(i+1)k2})$, ..., $(x_N, y_{(i+1)kN})$ may reduce y. Since no relay node knows enough $y_{(i+1)k}$, no relay node may reduce y.

Step D5: The relay nodes $n_{M1}, n_{M2}, \ldots$, and $n_{MN}$ of the M-th relay node layer transmit $(x_1, y_{M1})$, $(x_2, y_{M2})$, ..., and $(x_N, y_{MN})$ to the receiving device Bob through quantum secure direct communication.

Step D6: Bob obtains $(x_1, y_{M1})$, $(x_2, y_{M2})$, ..., $(x_N, y_{MN})$ by decoding with the random keys Bob knows.

Step D7: Whether each relay, Alice and Bob are honest is checked, and as long as the number of honest relay nodes in the middle is greater than or equal to the threshold t, Bob may obtain the secret information y of Alice through a sixth decoding formula, and any malicious node or eavesdropper may not obtain any information about y. The sixth decoding formula is:

$$y=F(0)=\sum_{i}y_{Mi}\frac{\prod_{j}x_{j}}{\prod_{j}(x_{i}-x_{j})}.$$

It is to be noted that the embodiments in the specification are described in a progressive manner, where the description of each embodiment focuses on the differences from other embodiments, and the same or similar parts between the embodiments may be cross-referenced. As for the system embodiments, as they are basically similar to the method embodiments, their descriptions are relatively simple. As for related parts, please refer to the descriptions of the method embodiments.

Finally, it should also be noted that in this article, terms about relations such as first and second are only used to distinguish one entity or operation from another entity or operation, and do not necessarily require or imply any such actual relation or order between these entities or operations. Moreover, the terms "comprise", "include" or any other variants thereof are intended to cover non-exclusive inclusion, so that a process, method, article or device including a series of elements not only includes those elements, but also includes other elements not clearly listed, or also includes elements inherent to this process, method, article or device. In the circumstance of no additional constrictions, an element defined by the phrase "comprises a/an . . . " does not preclude the existence of additional identical elements in the process, method, article, or device that includes the element.

For the sake of description, the above system is divided into various units based on functions for description. Of course, during the implementation of the present invention, the functions of the units may be implemented in one or more software and/or hardware.

As can be seen from the above description of the implementations, it is apparent to the technicians in the art that the present invention can be implemented with the aid of software plus necessary common hardware platforms. Based on this understanding, the technical solutions of the present invention substantially may be, or their contribution to the prior art may be, embodied in the form of a software product. The software product may be stored in a storage medium, such as an ROM/RAM, a disk or a CD-ROM, and includes a plurality of instructions to cause a computer device (which may be a personal computer, a server, or a network device, or the like) to perform the method described in the various embodiments, or in some portions of the embodiments, of the present invention.

The data communication method provided by the present invention is described in details above. Specific examples are used herein to illustrate the principles and implementation modes of the present invention, and the descriptions of the above embodiments are merely used to help understand the method of the present invention and the core idea thereof. Meanwhile, for ordinary technicians in the art, changes may be made to the specific implementation modes and applications in light of the idea of the present invention. In view of the above, the specification should not be construed as limiting the present invention.

What is claimed is:

1. A data communication method, wherein the method is applied to a transmitting device and comprises: processing to-be-transmitted target secret information based on a set security threshold by using a preset secret sharing algorithm, to obtain a plurality of secret fragments, wherein the security threshold is less than or equal to a number of the secret fragments; and transmitting each secret fragment to a respective relay node corresponding to the secret fragment in a first relay node layer among preset M relay node layers for allowing the relay node that receives the secret fragment to obtain secret information of the relay node according to the secret fragment received by the relay node, to transmit the plurality of secret fragments to a receiving device via each relay node in the M relay node layers, so that the receiving device can obtain the target secret information based on each received secret fragment under the condition that the number of the received secret fragments is greater than or equal to the security threshold, wherein M is a positive integer, each relay node in each of the relay node layers is configured to transmit the received secret fragment to a next hop device of the relay node;

the next hop device of the relay node is the receiving device or each relay node in a next relay node layer of the relay node;

wherein in the case that the next hop device of the relay node is the receiving device, the secret information is transmitted to the receiving device, so as to transmit the secret fragment to the receiving device; and in the case that the next hop device of the relay node is not the receiving device, the secret information is processed by using the secret sharing algorithm to obtain a plurality of secret fragments of the secret information, the number of the plurality of secret fragments of the secret information being the number of relay nodes in a next relay node layer of the relay node, and the plurality of secret fragments of the secret information are distributed to relay nodes corresponding to the secret fragments of the secret information in the next relay node layer of the relay node, so as to transmit the secret information to the receiving device;

prior to processing to-be-transmitted target secret information by using a preset secret sharing algorithm to obtain a plurality of secret fragments, the method further comprises:

assigning, for each relay node in the first relay node layer among the M relay node layers, a random key corresponding to the relay node according to a preset quantum key distribution method;

accordingly, the process that distributes the plurality of secret fragments to each relay node in a first relay node layer among preset M relay node layers comprises:

encrypting each of the secret fragments with the random key corresponding to each relay node in the first relay node layer, and transmitting each of the encrypted secret fragments to the relay node in the first relay node layer corresponding to the secret fragment; and determining whether the transmitting device, a receiving device, and each relay node are honest using quantum security detection, and based on detection of a dishonest node performing an alarm operation, wherein M>1.

2. The method based on claim 1, wherein a preset secret sharing algorithm processes to-be-transmitted target secret information to obtain a plurality of secret fragments, and the process comprises:

randomly generating a secret curve of the target secret information based on the security threshold by using the secret sharing algorithm, wherein the security threshold is greater than 1;

selecting a plurality of coordinate points from the secret curve, the number of the plurality of coordinate points being greater than or equal to the security threshold; and taking the plurality of selected coordinate points as the secret fragments of the target secret information.

3. The method according to claim 1, wherein quantum security detection comprises determining a channel detection error rate and determining whether the channel detection error rate is greater than a set error rate threshold.

4. The method according to claim 1, wherein quantum security detection further comprises determining whether a relay node is honest by comparing calculation results of different groups of nodes of each of the relay nodes to verify consistency.

5. A data communication apparatus, wherein the apparatus is applied to a transmitting device, and the apparatus comprises:
a first processor configured to process to-be-transmitted target secret information based on a set security threshold by using a preset secret sharing algorithm, to obtain a plurality of secret fragments;
wherein the security threshold is less than or equal to a number of the secret fragments; and
a transmitter configured to send each secret fragment to a respective relay node corresponding to the secret fragment in a first relay node layer among preset M relay node layers for allowing the relay node that receives the secret fragment to obtain secret information of the relay node according to the secret fragment received by the relay node, to transmit the plurality of secret fragments to a receiving device via each relay node in the M relay node layers, so that the receiving device can obtain the target secret information based on each received secret fragment under the condition that the number of the received secret fragments is greater than or equal to the security threshold, wherein M is a positive integer, each physical relay node in each of the relay node layers is configured to transmit the received secret fragment to a next hop device of the relay node; and
the next hop device of the relay node is the receiving device or each relay node in a next relay node layer of the relay node;
wherein in the case that the next hop device of the relay node is the receiving device, the secret information is transmitted to the receiving device, so as to transmit the secret fragment to the receiving device; and
in the case that the next hop device of the relay node is not the receiving device, the secret information is processed by using the secret sharing algorithm to obtain a plurality of secret fragments of the secret information, the number of the plurality of secret fragments of the secret information being the number of relay nodes in a next relay node layer of the relay node, and the plurality of secret fragments of the secret information are distributed to relay nodes corresponding to the secret fragments of the secret information in the next relay node layer of the relay node, so as to transmit the secret information to the receiving device;
prior to processing to-be-transmitted target secret information by using a preset secret sharing algorithm to obtain a plurality of secret fragments, the method further comprises: assigning, for each relay node in the first relay node layer among the M relay node layers, a random key corresponding to the relay node according to a preset quantum key distribution method, accordingly, the process that distributes the plurality of secret fragments to each relay node in a first relay node layer among preset M relay node layers comprises: encrypting each of the secret fragments with the random key corresponding to each relay node in the first relay node layer, and transmitting each of the encrypted secret fragments to the relay node in the first relay node layer corresponding to the secret fragment; and
determining whether the transmitting device, a receiving device, and each relay node are honest using quantum security detection and based on detection of a dishonest node performing an alarm operation, wherein M>1.

6. A data communication method, wherein the method is applied to a receiving device and comprises:
receiving each secret fragment transmitted by a transmitting device via each relay node in preset M relay node layers, the secret fragments being obtained by the transmitting device by processing to-be-transmitted target secret information based on a set security threshold by using a preset secret sharing algorithm; and
obtaining the target secret information based on each received secret fragment in the case that a number of the received secret fragments is greater than or equal to the security threshold,
wherein M is a positive integer, each relay node in each of the relay node layers is configured to transmit the received secret fragment to a next hop device of the relay node; the next hop device of the relay node is the receiving device or each relay node in a next relay node layer of the relay node, and the receiving device is a next hop device of each relay node in an M-th relay node layer among the M relay node layers; and
wherein in the case that the next hop device of the relay node is the receiving device, the secret information is transmitted to the receiving device, so as to transmit the secret fragment to the receiving device; and in the case that the next hop device of the relay node is not the receiving device, the secret information is processed by using the secret sharing algorithm to obtain a plurality of secret fragments of the secret information, the number of the plurality of secret fragments of the secret information being the number of relay nodes in a next relay node layer of the relay node, and the plurality of secret fragments of the secret information are distributed to relay nodes corresponding to the secret fragments of the secret information in the next relay node layer of the relay node, so as to transmit the secret information to the receiving device;
prior to processing to-be-transmitted target secret information by using a preset secret sharing algorithm to obtain a plurality of secret fragments, the method further comprises:
assigning, for each relay node in a first relay node layer among the M relay node layers, a random key corresponding to the relay node according to a preset quantum key distribution method;
accordingly, the process that distributes the plurality of secret fragments to each relay node in a first relay node layer among preset M relay node layers comprises:
encrypting each of the secret fragments with the random key corresponding to each relay node in the first relay node layer, and transmitting each of the encrypted secret fragments to the relay node in the first relay node layer corresponding to the secret fragment; and
determining whether the transmitting device, the receiving device, and each relay node are honest using quantum security detection and based on detection of a dishonest node performing an alarm operation,
wherein M≥1.

7. A data communication apparatus, wherein the apparatus is applied to a receiving device and comprises:
a receiver configured to receive each secret fragment transmitted by a transmitting device via each relay node in preset M relay node layers, the secret fragments being obtained by the transmitting device by processing to-be-transmitted target secret information based on a set security threshold by using a preset secret sharing algorithm; and
a second processor configured to obtain the target secret information based on each received secret fragment in the case that a number of the received secret fragments is greater than or equal to the security threshold, wherein M is a positive integer, each physical relay node in each of the relay node layers is configured to transmit the received secret fragment to a next hop device of the relay node; the next hop device of the relay node is the receiving device or each relay node in a next relay node layer of the relay node, and the receiving device is a next hop device of each relay node in an M-th relay node layer among the M relay node layers;

wherein in the case that the next hop device of the relay node is the receiving device, the secret information is transmitted to the receiving device, so as to transmit the secret fragment to the receiving device; and in the case that the next hop device of the relay node is not the receiving device, the secret information is processed by using the secret sharing algorithm to obtain a plurality of secret fragments of the secret information, the number of the plurality of secret fragments of the secret information being the number of relay nodes in a next relay node layer of the relay node, and the plurality of secret fragments of the secret information are distributed to relay nodes corresponding to the secret fragments of the secret information in the next relay node layer of the relay node, so as to transmit the secret information to the receiving device;

prior to processing to-be-transmitted target secret information by using a preset secret sharing algorithm to obtain a plurality of secret fragments, the method further comprises: assigning, for each relay node in a first relay node layer among the M relay node layers, a random key corresponding to the relay node according to a preset quantum key distribution method;

accordingly, the process that distributes the plurality of secret fragments to each relay node in a first relay node layer among preset M relay node layers comprises:

encrypting each of the secret fragments with the random key corresponding to each relay node in the first relay node layer, and transmitting each of the encrypted secret fragments to the relay node in the first relay node layer corresponding to the secret fragment; and determining whether the transmitting device, the receiving device, and each relay node are honest using quantum security detection and based on detection of a dishonest node performing an alarm operation, wherein M>1.

8. A data communication system, wherein the system comprises: a transmitter, M relay node layers, and a receiver, M being a positive integer, and each of the relay node layers comprising a plurality of relay nodes, wherein the transmitter is configured to process to-be-transmitted target secret information based on a set security threshold by using a preset secret sharing algorithm to obtain a plurality of secret fragments, and transmit the plurality of secret fragments to the receiver via each relay node in the M relay node layers; and the receiver is configured to obtain the target secret information based on each received secret fragment in the case that a number of the received secret fragments is greater than or equal to the security threshold, wherein each physical relay node in each of the relay node layers is configured to transmit the received secret fragment to a next hop device of the relay node, and the next hop device of the relay node is the receiver or each relay node in a next relay node layer of the relay node;

wherein the relay node is specifically configured to obtain secret information of the relay node based on the secret fragment received by the relay node;

in the case that the next hop device of the relay node is the receiver, the secret information is transmitted to the receiver, so as to transmit the secret fragment to the receiver; and in the case that the next hop device of the relay node is not the receiver, the secret information is processed by using the secret sharing algorithm, to obtain a plurality of secret fragments of the secret information, the number of the plurality of secret fragments of the secret information is the number of relay nodes in a next relay node layer of the relay node, and the plurality of secret fragments of the secret information are distributed to relay nodes corresponding to the secret fragments of the secret information in the next relay node layer of the relay node;

the transmitter is further configured to assign, for each relay node in a first relay node layer among the M relay node layers, a random key corresponding to the relay node according to a preset quantum key distribution method, and trigger each of the relay nodes that have obtained the random keys to assign new random keys for the next hop device of the relay node according to the quantum key distribution method;

accordingly, the transmitter is configured to encrypt each of the secret fragments with the random key corresponding to each relay node in the first relay node layer, and transmit each of the encrypted secret fragments to the relay node in the first relay node layer corresponding to the secret fragment;

each of the relay nodes is configured to decrypt the received encrypted secret fragment based on a first random key of the relay node, to obtain secret information of the relay node; in the case that the next hop device of the relay node is the receiver, the relay node encrypts the secret information based on a second random key of the relay node, and transmits the encrypted secret information to the receiver, so as to transmit the secret fragment to the receiver;

in the case that the next hop device of the relay node is not the receiver, the relay node encrypts secret information of the relay node by using the secret sharing algorithm, to obtain a plurality of encrypted secret fragments of the secret information, the number of the plurality of secret fragments of the secret information is the number of relay nodes in a next relay node layer of the relay node, and the plurality of encrypted secret fragments of the secret information are distributed to relay nodes corresponding to the secret fragments of the secret information in the next relay node layer of the relay node, wherein the first random key of each of the relay nodes is a random key assigned by a previous hop device of the relay node; the second random key of each of the relay nodes is a random key assigned by the relay node for the next hop device thereof;

the previous hop device of each of the relay nodes is the transmitter or each relay node in a previous relay node layer of the relay node; and determining whether the transmitter, the receiver, and each relay node are honest using quantum security detection and based on detection of a dishonest node performing an alarm operation, wherein M>1.

* * * * *